US010834458B2

(12) United States Patent
Baughman et al.

(10) Patent No.: US 10,834,458 B2
(45) Date of Patent: Nov. 10, 2020

(54) AUTOMATED VIDEO DETECTION AND CORRECTION

(71) Applicant: INTERNATIONAL BUSINESS MACHINES CORPORATION, Armonk, NY (US)

(72) Inventors: Aaron K. Baughman, Silver Spring, MD (US); Stephen C Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/368,975

(22) Filed: Mar. 29, 2019

(65) Prior Publication Data
US 2020/0314488 A1   Oct. 1, 2020

(51) Int. Cl.
| H04H 60/59 | (2008.01) |
| H04N 21/44 | (2011.01) |
| H04N 21/472 | (2011.01) |
| H04N 21/439 | (2011.01) |

(52) U.S. Cl.
CPC ... *H04N 21/44008* (2013.01); *H04N 21/4394* (2013.01); *H04N 21/47205* (2013.01); *H04N 21/47217* (2013.01)

(58) Field of Classification Search
CPC ......... H04N 21/44008; H04N 21/4394; H04N 21/47205; H04N 21/47217
USPC .......................................................... 725/9
See application file for complete search history.

(56) References Cited

U.S. PATENT DOCUMENTS

| 5,920,360 | A | 7/1999 | Coleman, Jr. |
| 5,959,697 | A | 9/1999 | Coleman, Jr. |
| 6,686,970 | B1* | 2/2004 | Windle ................. H04N 5/232 |
| | | | 348/584 |
| 7,177,376 | B2 | 2/2007 | Atungsiri |
| 7,572,028 | B2 | 8/2009 | Mueller |
| 8,451,832 | B2* | 5/2013 | Takai ....................... G06F 3/03 |
| | | | 370/389 |
| 10,536,758 | B2* | 1/2020 | Packard ........... H04N 21/23424 |

(Continued)

OTHER PUBLICATIONS

Sharma, Rahul Anand; Automatic Analysis of Cricket and Soccer Broadcast Videos; Thesis submitted for MS by Research in Computer Science and Engineering; Center for Visual Information Technology (CVIT), International Institute of Information Technology; Jul. 2016; 76 pages.

(Continued)

*Primary Examiner* — Nathan J Flynn
*Assistant Examiner* — Caroline Somera
(74) *Attorney, Agent, or Firm* — Schmeiser, Olsen & Watts; Christopher M. Pignato (57) ABSTRACT

A method and system for improving automated video detection and correction is provided. The method includes retrieving a portion of a video stream and dividing the portion into video frames and an audio file. The video frames and audio file are analyzed, and a speech polarity of the audio file is detected. Likewise, a visual action epicenter of the portion of the video stream is detected and a fade portion of the portion of the video stream is removed. An edited fade portion associated with the fade portion is generated and patched into the video stream. The edited fade portion patched into the video stream is presented via a display device.

20 Claims, 6 Drawing Sheets

(56) References Cited

U.S. PATENT DOCUMENTS

| | | | |
|---|---|---|---|
| 2001/0021267 A1* | 9/2001 | Jun | G06K 9/00765 382/165 |
| 2004/0125877 A1* | 7/2004 | Chang | G06K 9/00335 375/240.28 |
| 2006/0112411 A1* | 5/2006 | Takai | G06F 3/03 725/89 |
| 2011/0255605 A1* | 10/2011 | Chang | G11B 27/28 375/240.18 |
| 2012/0281969 A1 | 11/2012 | Jiang | |
| 2015/0082349 A1 | 3/2015 | Ishtiaq | |
| 2016/0196666 A1 | 7/2016 | Venkatraghavan | |
| 2017/0289617 A1 | 10/2017 | Song | |
| 2018/0167648 A1* | 6/2018 | Lee | G11B 27/00 |
| 2020/0090701 A1* | 3/2020 | Xu | G11B 27/036 |

OTHER PUBLICATIONS

Campisi, Patrizio et al.; Automatic Dissolve and Fade Detection for Video Sequences; 14th International conference on Digital Signal Processing; Jul. 1-3, 2002; pp. 567-570.

Cernekova, Z. et al.; Entropy Metrica used for Video Summarization; Proceedings of the 18th Spring Conference on Computer Graphics; Apr. 24-27, 2002; pp. 73-82.

Diggins, Joe; Detecting Cross-Fades in Interlaced Video with 3:2 Film Cadence; IEEE Transactions on Circuits and Systems for Video Technology; vol. 19, Issue 7, Jul. 2009; pp. 1063-1067.

Ferzoli Guimaraes, Silvio Jamil et al.; Video fade detection by discrete line identification; ICC Conference on Object recognition supported by user interaction for service robots; Aug. 11-15, 2002; 4 pages.

Jun, Sung-Bae et al.; Dissolve transition detection algorithm using spatio-temporal distribution of MPEG macro-block types (poster session); Proceedings of the 8th ACM International conference on Multimedia; Oct. 30 -Nov. 3, 2000; pp. 391-394.

Kim, Hoseong et al.; Exploiting Web Images for Video Highlight Detection with Triplet Deep Ranking; IEEE Transactions on Multimedia; vol. 20, Issue 9, Sep. 2018; pp. 2415-2426.

Truong, Ba Tu et al.; New enhancements to cut, face, and dissolve detection processes in video segmentation; Proceedings of the eighth ACM International conference on Multimedia; Oct. 30-Nov. 3, 2000; pp. 219-227.

* cited by examiner

AUTOMATED VIDEO DETECTION AND CORRECTION

FIELD

The present invention relates generally to a method for highlighting a video stream transition and in particular to a method and associated system for improving audio/video projection technology by automatically retrieving video content and configuring portions of the video content for editing fade portions of the video content for automated projection.

BACKGROUND

Typical visual presentation systems allow for little flexibility with respect to scene detection. Automatically detecting video content may include a complicated process that may be time consuming and require a large amount of resources. Additionally, presenting specified focus content for users may require technically advanced equipment for enabling automated functionality.

SUMMARY

A first aspect of the invention provides an automated video detection and correction method comprising: retrieving, by a processor of a hardware device, a portion of a video stream; dividing, by the processor, the portion into a plurality of video frames and an audio file; analyzing, by the processor executing a first encoder apparatus of the hardware device, the plurality of video frames; analyzing, by the processor executing a second encoder apparatus of the hardware apparatus, the audio file; detecting, by the processor executing a natural language processing (NLP) system, a speech polarity of the audio file; detecting, by the processor based on analysis of an output of the first encoder apparatus, a visual action epicenter of the portion of the video stream; removing, by the processor based on the analysis of the output of the first encoder apparatus and analysis of an output of the second encoder apparatus, a fade portion of the portion of the video stream; generating, by the processor based on the visual action epicenter and the fade portion, an edited fade portion associated with the fade portion; patching, by the processor, the edited fade portion into the video stream; and presenting by the processor to users via a display device, the edited fade portion patched into the video stream.

A second aspect of the invention provides a computer program product, comprising a computer readable hardware storage device storing a computer readable program code, the computer readable program code comprising an algorithm that when executed by a processor of a hardware device implements a method, the method comprising: retrieving, by the processor, a portion of a video stream; dividing, by the processor, the portion into a plurality of video frames and an audio file; analyzing, by the processor executing a first encoder apparatus of the hardware device, the plurality of video frames; analyzing, by the processor executing a second encoder apparatus of the hardware apparatus, the audio file; detecting, by the processor executing a natural language processing (NLP) system, a speech polarity of the audio file; detecting, by the processor based on analysis of an output of the first encoder apparatus, a visual action epicenter of the portion of the video stream; removing, by the processor based on the analysis of the output of the first encoder apparatus and analysis of an output of the second encoder apparatus, a fade portion of the portion of the video stream; generating, by the processor based on the visual action epicenter and the fade portion, an edited fade portion associated with the fade portion; patching, by the processor, the edited fade portion into the video stream; and presenting by the processor to users via a display device, the edited fade portion patched into the video stream.

A third aspect of the invention provides a hardware device comprising a processor coupled to a computer-readable memory unit, the memory unit comprising instructions that when executed by the computer processor implements a method comprising: retrieving, by the processor, a portion of a video stream; dividing, by the processor, the portion into a plurality of video frames and an audio file; analyzing, by the processor executing a first encoder apparatus of the hardware device, the plurality of video frames; analyzing, by the processor executing a second encoder apparatus of the hardware apparatus, the audio file; detecting, by the processor executing a natural language processing (NLP) system, a speech polarity of the audio file; detecting, by the processor based on analysis of an output of the first encoder apparatus, a visual action epicenter of the portion of the video stream; removing, by the processor based on the analysis of the output of the first encoder apparatus and analysis of an output of the second encoder apparatus, a fade portion of the portion of the video stream; generating, by the processor based on the visual action epicenter and the fade portion, an edited fade portion associated with the fade portion; patching, by the processor, the edited fade portion into the video stream; and presenting by the processor to users via a display device, the edited fade portion patched into the video stream.

DETAILED DESCRIPTION

Figure 1:
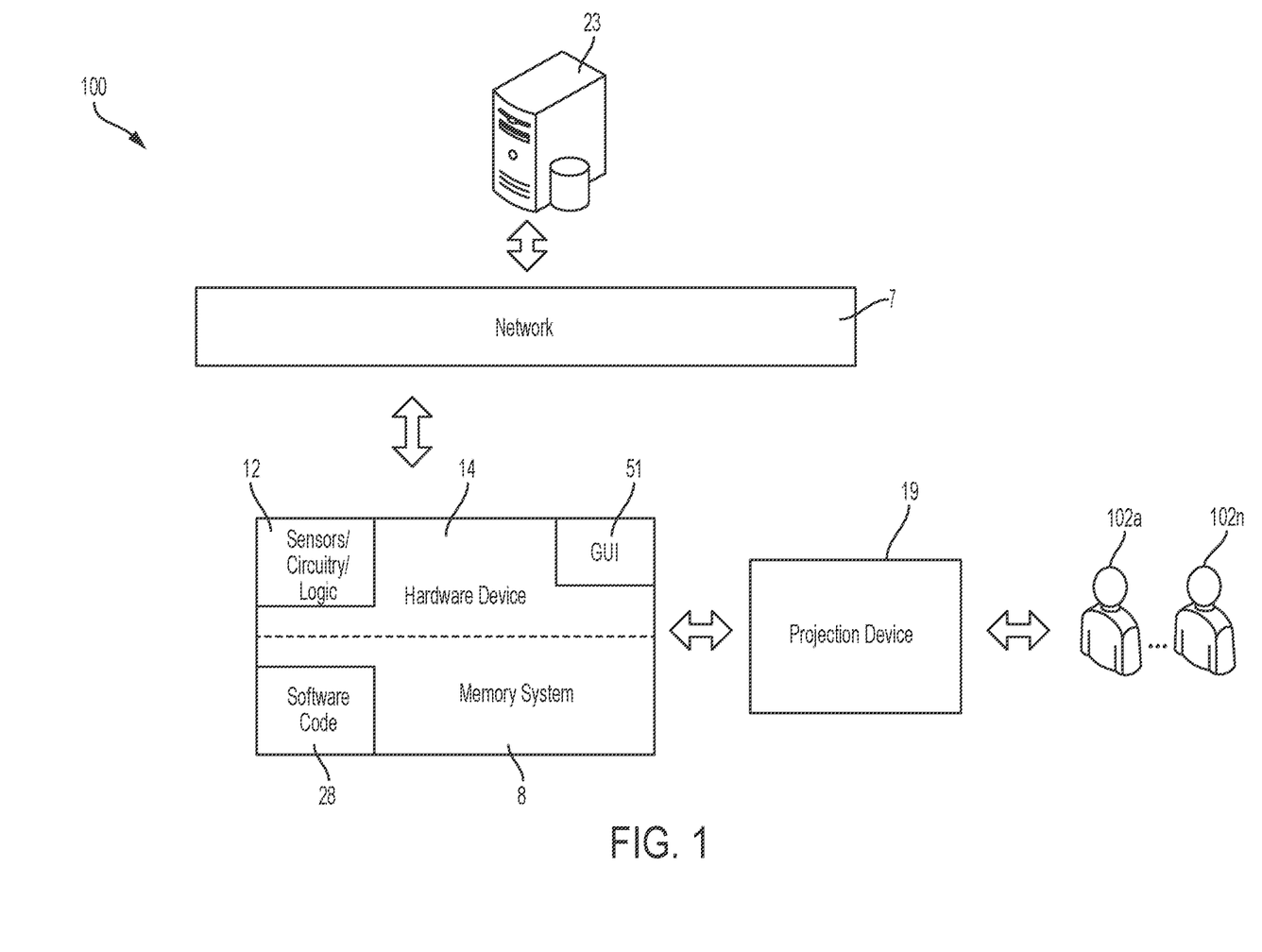
FIG. 1 illustrates a system for improving audio/video projection technology by automatically retrieving video content and configuring portions of the video content for editing fade portions of the video content for automated projection, in accordance with embodiments of the present invention.

FIG. 1 illustrates a system 100 for improving audio/video projection technology by automatically retrieving video content and configuring portions of the video content for editing fade portions of the video content for automated projection, in accordance with embodiments of the present invention. Typical media presentation systems do not allow for automated detection of visual dissolves and cross fades within a highlight of a video stream. A dissolve is defined herein as a first sequence of video frames fading into a background (of a video stream) while a second sequence of video frames emerge into a foreground (of the video stream) resulting in a new set of video frames are being presented within the foreground. A cross fade is defined herein as a sequence of video frames and associated audio portions that are faded into a background (of a video stream) with a specified directional pattern. Current solutions for automated detection of visual dissolves and cross fades include usage of color gradients, hue, and brightness to detect video camera changes. Additional solutions may include processes for focusing on a specified region of a video screen (comprising objects) and detecting if the objects disappear for the specified region. The aforementioned solutions may present many false negative and false positive results. Therefore system 100 is configured to improve audio/video projection technology by providing an accurate method for detecting fades and dissolves and determining if a transition is located within a current highlight. Additionally, system 100 enables a process for changing a rate and direction of a fade such that if a fade occurs towards a center of action (e.g., within a sporting event), a user experience will remain stable.

System 100 enables a process that includes creating a custom sports-based video stream including different video shots and players such that during a visual transition between action scenes, users may a view highlighted portions of the video stream. For example, during a golfing event, editing software may be configured to present: a player hitting a golf ball, the golf ball traveling through the air, and the golf ball landing on the green. Subsequently, the video stream presentation transitions to a new player or shot. Therefore, system 100 is configured to segment video clips and create visual highlights by detecting (within the video stream) crossfades, dissolves, and cuts that are not comprised by a video highlight portion of the video stream. Additionally, system 100 is configured to correct video fades such that the fade does not detract from the focus of the action and impair a user experience.

System 100 of FIG. 1 includes a server hardware device 23 connected through a network 7 to a hardware device 14 and a projection device 19 for projecting video streams to users 102a . . . 102n. Hardware device 14 comprises sensors/circuitry/logic 12, a graphical user interface (GUI) 51, and a (specialized) memory system 8. Memory system 8 comprises (self-learning) software code 28. Memory system 8 may include a single memory system.

Alternatively, memory system 8 may include a plurality of memory systems. Server hardware device 23 and hardware device 14 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 23 and hardware device 14 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving audio/video projection technology by automatically retrieving video content and configuring portions of the video content for editing fade portions of the video content for automated projection. Sensors/circuitry/logic 12 may include any type of internal or external sensors including, inter alia, GPS sensors, social network code-based sensors, environmental sensors, biometric sensors, voltage sensors, network traffic sensors, temperature sensors, audio/video retrieval devices, heartrate sensors, ultrasonic sensors, pressure sensors, light/optical sensors, brood pressure sensors, weather sensors, etc. Additionally, sensors/circuitry/logic 12 may include any type of internal or external circuitry including, inter alia, encoder circuitry, decoder circuitry, natural language processing (NLP) circuitry, etc. Network 7 may include any type of network including, inter alia, a local area network, (LAN), a wide area network (WAN), the Internet, a wireless network, etc.

System 100 executes the following computer-implemented process for automatically detecting and editing a fade pattern (e.g., cross, fade or dissolution) between two scenes in a video feed:

1. Obtaining a portion of a video feed prior to display.
2. Dividing the portion into jpeg frames and a way file.
3. Processing (via execution of a first auto encoder circuit) the jpeg frames.
4. Processing (via execution of a second auto encoder circuit) the way file.
5. Detecting (via execution of a natural language processing (NLP) circuit) a speech polarity of the way file.
6. Detecting (based on analysis of an output of the first auto encoder circuit) a visual action epicenter within the portion of the video feed.
7. Removing (based analysis of outputs from the first auto encoder circuit, the second auto encoder circuit, and the NLP circuit) a fade portion of video from the portion of the video feed.
8. Generating an edited fade portion of video within the portion of the video feed by applying speed regressions to a pre and post action (with respect to the to the fade portion) and adjusting a fade speed and fade epicenter.
9. Patching the edited fade portion into the video feed.
10. Presenting the patched video feed to viewers.

Figure 2:
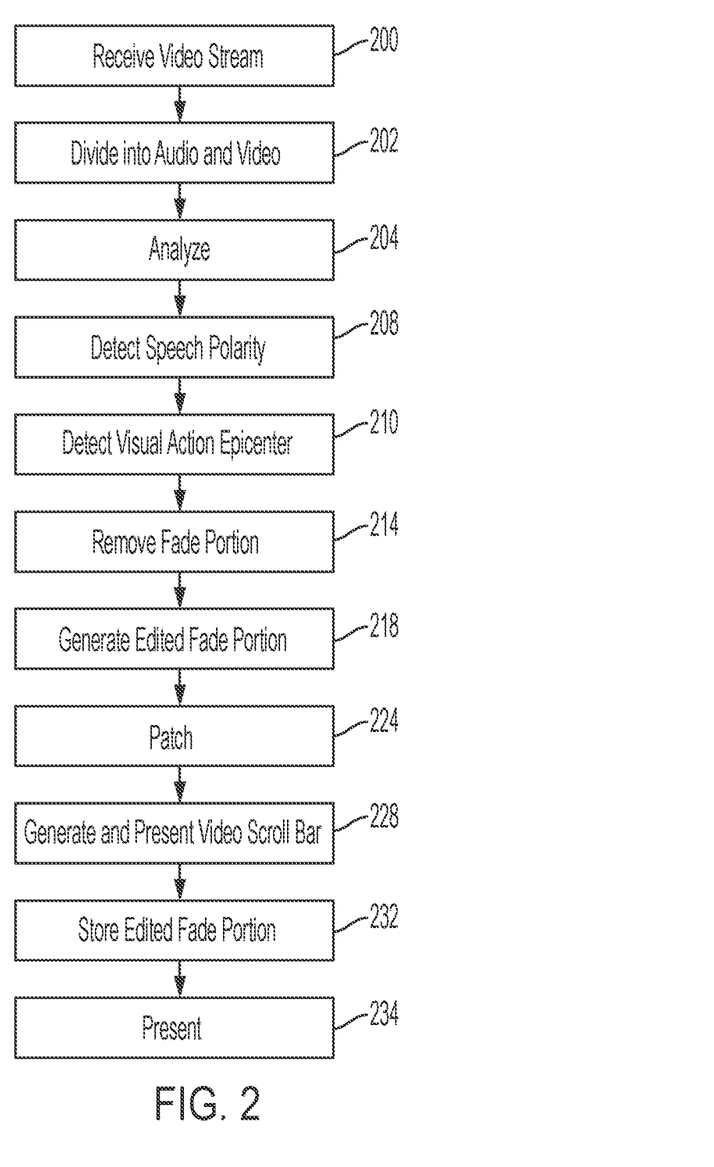
FIG. 2 illustrates an algorithm detailing a process flow enabled by the system of FIG. 1 for improving audio/video projection technology by automatically retrieving video content and configuring portions of the video content for editing fade portions of the video content for automated projection, in accordance with embodiments of the present invention.

FIG. 2 illustrates an algorithm detailing a process flow enabled by system 100 of FIG. 1 for improving audio/video projection technology by automatically retrieving video content and configuring portions of the video content for editing fade portions of the video content for automated projection, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 14 and projection device 19 of FIG. 1. In step 200, a portion of a video stream is retrieved. In step 202, the portion of the video stream is divided into a plurality of video frames and an audio file. In step 204, the plurality of video frames is analyzed via execution of a first encoder apparatus. Additionally, the audio file is analyzed via execution of a second encoder apparatus. In step 208, a speech polarity of the audio file is detected via execution of an NLP system. In step 210, a visual action epicenter of the portion of the video stream is detected based on analysis of an output of the first encoder apparatus. In step 214, a fade portion is removed from the portion of the video stream based on results of step 204. The fade portion may include a crossfade portion associated with the portion of the video stream. Alternatively, fade portion may include a dissolution between differing scenes within the portion of the video stream.

In step 218, an edited fade portion associated with the fade portion is generated based on the visual action epicenter and the fade portion. The edited fade portion may include a highlighted area of importance for viewing. Generating the edited fade portion may include:

1. Executing speed regression code with respect to actions of the visual action epicenter relative to the edited fade portion. Actions may include, inter alia, actions occurring before initiating the fade portion and actions occurring after completing the fade portion.
2. Adjusting (based on results of executing the speed regression code) a speed of the edited fade portion.
3. Adjusting (based on said results of executing speed regression code) a speed of the visual action epicenter.

In step 224, the edited fade portion is patched into the video stream. In step 228, a video scroll bar comprising graphical user interface activation portions is generated. The video scroll bar is configured for activating specified actions associated with the highlighted area of importance. The video scroll bar is presented (via a display device) adjacent to the edited fade portion patched into the video stream. In step 232, the edited fade portion patched into the video stream is stored within a specialized portion of a specialized memory device. In step 234, the edited fade portion patched into the video stream is presented to users via a display device.

Figure 3:
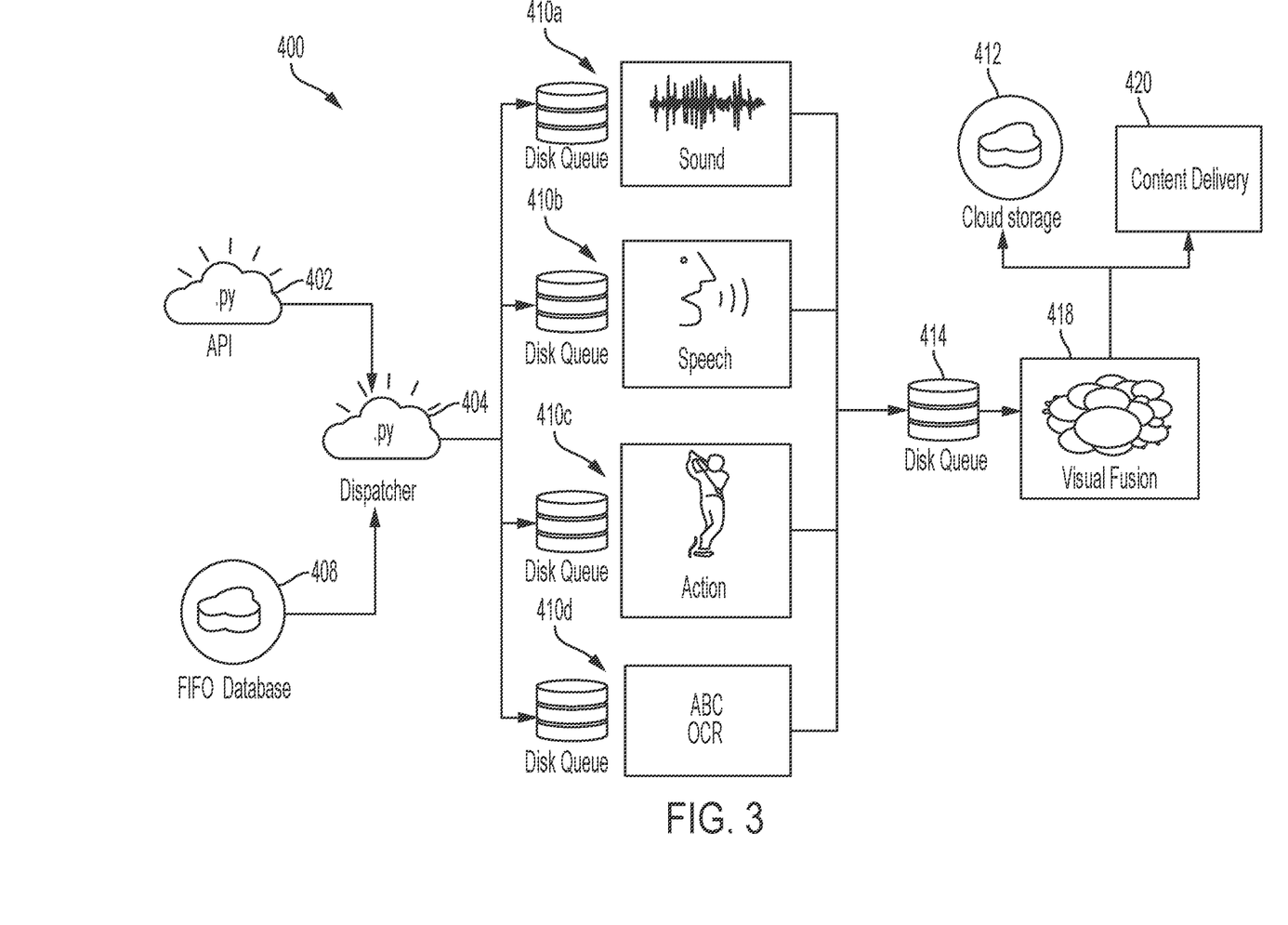
FIG. 3 illustrates an overall schematic diagram associated with the system of FIG. 1 for improving audio/video projection technology, in accordance with embodiments of the present invention.

FIG. 3 illustrates an overall schematic diagram 400 associated with system 100 for improving audio/video projection technology, in accordance with embodiments of the present invention. The schematic diagram 400 illustrates an application programming interface (API) 402, a dispatcher circuit 404, and a database 408 connected (via systems 410a . . . 410d) to a cloud storage system 412, a disk queue device 414, a visual fusion component 418, and a content delivery system 420 for generating a visual fusion comprising a highlighted portion of a video feed. Schematic diagram 400 illustrates an implementation example describing a process for configuring portions of golf-based video content for editing fade portions of the video content for automated projection. For example, golfers may typically encounter issues with a specific area of a golf course (e.g., comprising holes 11, 12, and 13) and therefore the specific area typically separates contenders from all additional players during a golf tournament. Likewise, tournament contenders may win or lose the golf tournament based on performance at holes 15 and 16 of the specific golf course. Therefore, specified players and competition dynamics may be combined into a featured group to encapsulate climatic moments during a visual presentation. Additional media director generated broadcast coverage that simulcasts to multiple channels may additionally produce candidate highlights. Therefore, a stretch of the golf tournament that includes the specific area, hole 15, and hole 16 along with the featured group and a broadcast simulcast are streamed to a scene clipper and an AI highlight ranking system on cloud storage 412. All produced video clips (of a video file) may enter the system via a python flask application or a FIFO database 408. Subsequently, the video file (e.g., an mp4 file) is split into 1 frame per second jpg files and 6 second way files. Each way file requires a same duration for preparation for feature extraction via a soundnet system 410a. If any of the way files are less than 6 seconds, an empty way file is generated by sox and saved on a disk queue. The empty wave file is subsequently appended to the end of an original way file way to guarantee that the file is comprises a 6 second duration. Every way file undergoes the aforementioned pre-processing step. If the mp4 file is pulled from the FIFO database 408, a document-based record is updated such that additional system dispatchers will not retrieve work that has already been processed. An associated update is immediately executed to minimize the duplicate execution processes. A query locates all documents that do not include a status field. A status field typically stores a state of a piece of work such as, for example, "retrieved".

In response to the aforementioned query, a job JSON file is written into a disk-based queue for a dispatcher. The job JSON file references a location of the original mp4 file and splits the original MP4 file into jpeg files and way files. The dispatcher iterates within a work loop within its associated job queue and maintains status of each job. Additionally, the dispatcher ensures that a job is completed within a specific time timeframe. During each iteration, the dispatcher executes a maintenance process with respect to each launched job. A maximum number of concurrent jobs protect a highlight ranker apparatus from excessive CPU, GPU, and memory usage. Additionally, four simultaneous processes are executed via hardware sockets to interpret sound, action, speech, and graphics.

The way files of the MP4 file are used for editing fade portions of video content for automated projection. For example, during the golf tournament, dramatic moments may be punctuated via sound from spectators or a gesture by a player and/or commentator. If the spectators produce an uproar of audible enthusiasm, this may be a great indicator of a very interesting highlight segment. Likewise, additional cheering from the player and commentator may add to a level of enthusiasm and subsequently each of the way files that encode audio during golf play is converted into an mp3 file. Subsequently, a numerical understanding with respect to the audio is decoded from a deep 1-D convolutional neural network (i.e., SoundNet) for encoding a representation of audio from over 2 million video files. Features from a conv-5 layer are exported for each input audible sound. An exported feature comprises a vector size of 17,152 and is transmitted to two different support vector machine (SVM) models. An implemented cheer magnitude detector circuit may be trained via self-learning code. Feature vectors comprising known cheer magnitudes ae labeled with a ground truth and used to train optimal margins of the SVM models. A resulting output of a first SVM model is used to measure a degree of cheering. A resulting output of a second SVM model is used to measure a general enthusiasm level from audible speech recorded during the golf tournament. A feature vector from the SoundNet is inputted into an enthusiasm model SVM. The output of the enthusiasm model SVM may comprise an additional indicator representing a quality highlight portion. All results from the first and second SVMs are transmitted to visual fusion component 418.

Commentary during the golf tournament provides domain knowledge clues with respect to a strategic importance of a specified golf stroke. A commentator's speech may expresses drama and a significance of a golf play. A general sentence structure and sentiment provide a base commentator enthusiasm level. For example, an output from system 410b (associated with a speech to text system) may be transmitted to a natural language polarity scorer for enabling a polarity of transcribed text for each way file to be calculated and scaled. Subsequently, specific spot words within the commentator's dictation such as, inter alia, "amazing", "beautiful shot", "great", etc. may be added to a magnitude level of enthusiasm. Golf subject matter experts (SMEs) provide a relative weight and importance of spot words. The relative weights of all spot words are summed to a maximum value of 1 and a semantic score of for text is averaged with a spot word score. The system translates the speech to text such that every way file is translated into a text file with a corresponding time. The text file is transmitted to a natural language module for retrieving a general polarity measure value associated with the text file.

Visual gestures before, during, or after a golf move illustrate an occurrence of a pinnacle of action. For example, a first pump or both hands in the air generally indicate a significant outcome and a player celebration. An animation of body motion may be represented within a series of jpeg files that have been split from the mp4 file. A deep learning model iteratively trained on custom data illustrates multiple examples comprising significant gestures and non-significant gestures. Each image of the Jpeg file is preprocessed to create a standardized size, number of channels, and image background. A resulting image is transmitted to a data augmentator to generate new images. Each image is randomly cropped and mirrored into a set of new images. The set of new images is inputted into a module for action recognition. Each Jpeg score is written to file storage and a message is transmitted to an evidence fusion socket listener.

A process for searching for similar broadcast graphics is executed for determining if candidate video clips may be subdivided further. If a graphic is located, a region of interest is segmented from a frame for OCR processing. An output of the aforementioned process is processed to locate a golfer that was mentioned along with hole number and general text. A result is transmitted to an evidence fusion socket listener.

Each of the candidate video clips and associated predictors from sound, speech, gesture, and graphics provide a basis for evidential ranking. As a video clip is analyzed from parallel features extractors and finishes, the fusion socket determines if all extractors have completed. If the multimedia algorithm is complete, actions are extracted from an associated video clip. Any number of actions may be segmented from the original video clip based on encapsulated golf logic. For example, multiple shots within one video clip should be scored separately so that they do not have direct influence over the model outputs. Television graphics are used to segment the video clip into different actions. Each of the detected cheer times are iterated through to locate a closest television graphic time. For example, a start time may occur 5 seconds before a closest television appearance time while an end time may be determined by detecting a scene change by examining a color histogram difference between each neighboring frame.

Timing for every action segment is used to lookup specific predictors for speech, sound, and action. Gesture logic is executed for locating a maximum score that is located within an action start and end time. Likewise, a maximum score for speaker enthusiasm is retrieved between the action's time period. A speech to text component averages over the semantic meaning of every sentence from the speech to text transcript and enhances with spot word detection. A crowd enthusiasm score is returned. Fusing multimedia evidence together enables a process for ranking each of the actions within a video clip. An overall enthusiasm score represents a relative ranking with respect to other highlights. A resulting JSON file is transmitted sent to a content management system and uploaded to a highlights database.

Figure 4:
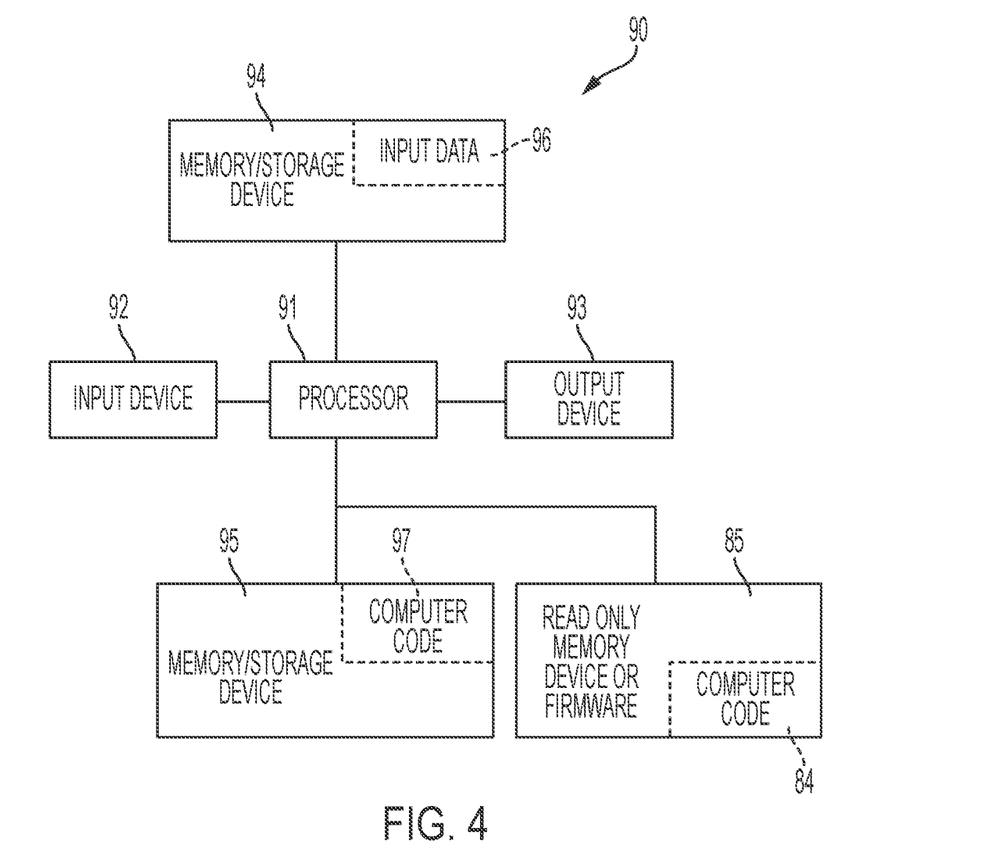
FIG. 4 illustrates a computer system used by the system of FIG. 1 for improving audio/video projection technology by automatically retrieving video content and configuring portions of the video content for editing fade portions of the video content for automated projection, in accordance with embodiments of the present invention.

FIG. 4 illustrates a computer system 90 (e.g., server hardware device 23 and hardware device 14 of FIG. 1) used by or comprised by the system of FIG. 1 for improving audio/video projection technology by automatically retrieving video content and configuring portions of the video content for editing fade portions of the video content for automated projection, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 2) for improving audio/video projection technology by automatically retrieving video content and configuring portions of the video content for editing fade portions of the video content for automated projection. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve audio/video projection technology by automatically retrieving video content and configuring portions of the video content for editing fade portions of the video content for automated projection. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving audio/video projection technology by automatically retrieving video content and configuring portions of the video content for editing fade portions of the video content for automated projection. In another embodiment, the invention provides a business method that performs the process steps of the invention on a subscription, advertising, and/or fee basis. That is, a service supplier, such as a Solution Integrator, could offer to enable a process for improving audio/video projection technology by automatically retrieving video content and configuring portions of the video content for editing fade portions of the video content for automated projection. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
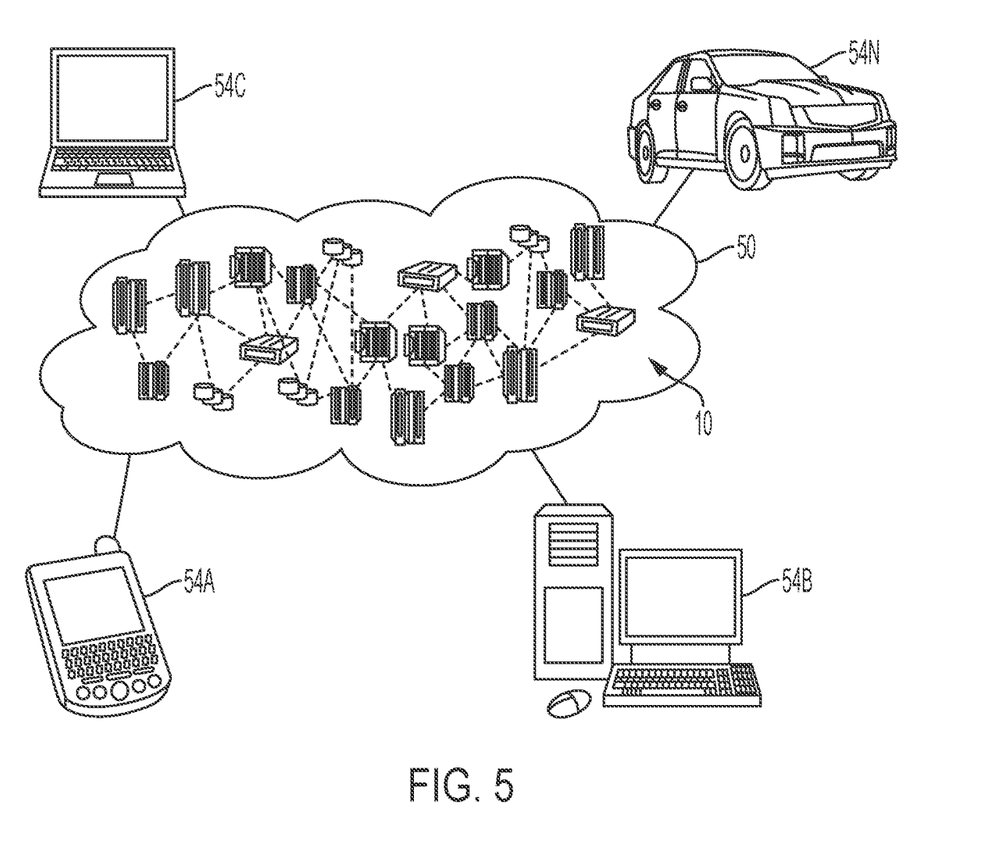
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
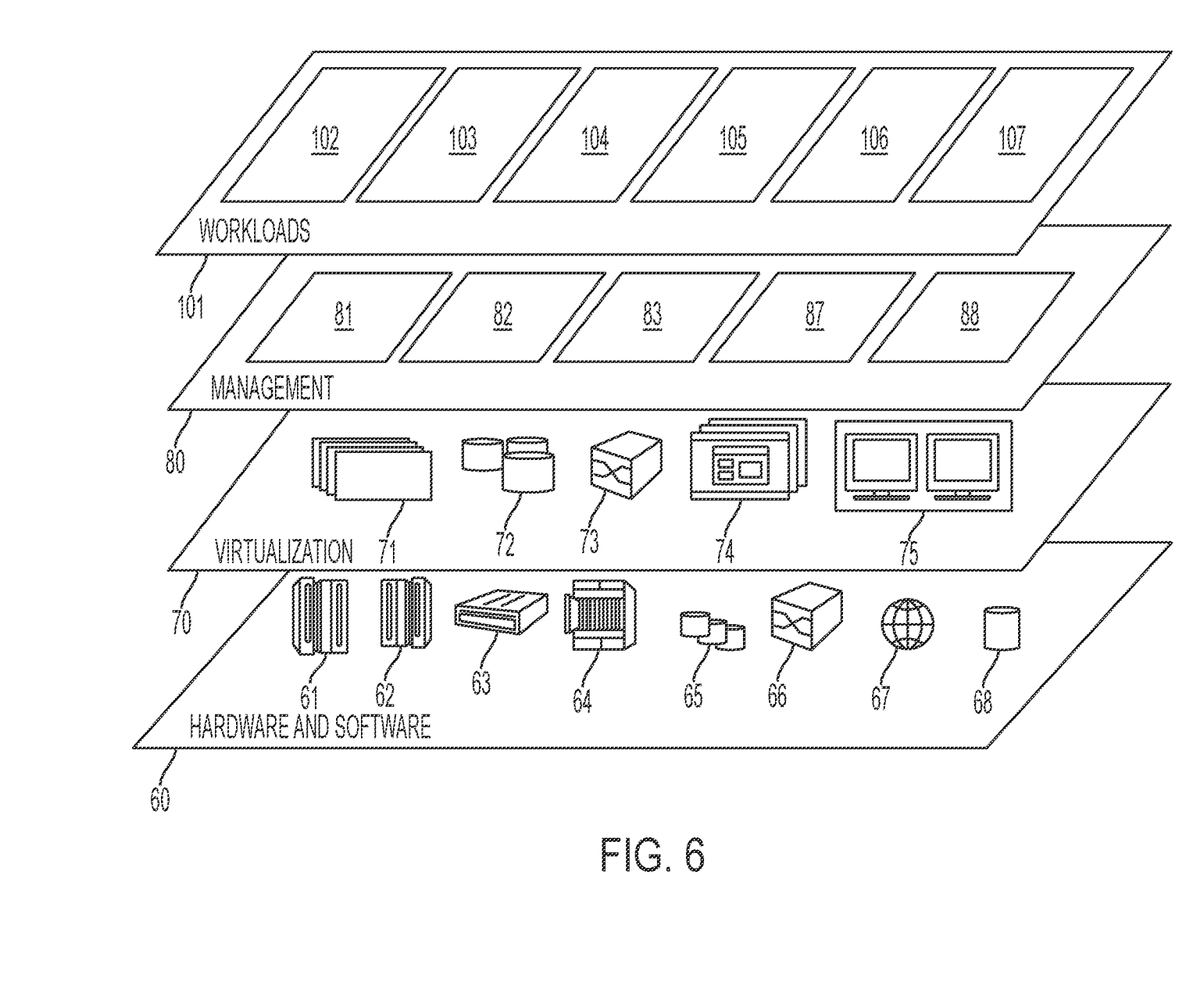
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving audio/video projection technology by automatically retrieving video content and configuring portions of the video content for editing fade portions of the video content for automated projection 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated video detection and correction method comprising:
   retrieving, by a processor of a hardware device, a portion of a video stream;
   updating, by said processor, a document-based record configured to prevent additional system dispatchers from retrieving video files that have been processed;
   executing, by said processor, a query with respect to said document-based record;
   writing, by said processor in response to said executing said query, a JSON file into a disk-based queue for dispatch;
   dividing, by said processor executing said JSON file within said disk-based queue for referencing a location of said portion of said video stream, said portion into a plurality of video frames and an audio file, wherein said dividing comprises:
      associating each video frame of said plurality of video frames with a first specified time duration;
      dividing said audio file into a plurality of audio file portions; and
      associating each audio file portion of said plurality of audio file portions with a second specified time duration;
   analyzing, by said processor executing a first encoder apparatus of said hardware device, said plurality of video frames with respect to sound, action, speech, and graphics;
   analyzing, by said processor executing a second encoder apparatus of said hardware apparatus, each said audio file portion of said audio file;
   detecting, by said processor executing a natural language processing (NLP) system, a speech polarity of each said audio file portion of said audio file;
   detecting, by said processor based on analysis of an output of said first encoder apparatus, a visual action epicenter of said portion of said video stream;
   removing, by said processor based on said analysis of said output of said first encoder apparatus and analysis of an output of said second encoder apparatus, a fade portion fading into a background of said portion of said video stream;
   generating, by said processor based on said visual action epicenter and said fade portion, an edited fade portion associated with said fade portion, wherein said edited fade portion comprises first video frames for presentation within a foreground portion of said portion of said video stream, and wherein said generating said edited fade portion comprises randomly cropping and mirroring said fade portion into a set of new images comprised by said edited fade portion;
   patching, by said processor, said edited fade portion into said video stream; and
   presenting by said processor to users via a display device, said edited fade portion patched into said video stream.

2. The method of claim 1, wherein said generating said edited fade portion comprises:
   executing speed regression code with respect to actions of said visual action epicenter relative to said edited fade portion;

adjusting, based on results of said executing speed regression code, a speed of said edited fade portion; and
adjusting, based on said results of said executing speed regression code, a speed of said visual action epicenter.

3. The method of claim 2, wherein said actions comprise actions occurring before said initiating said fade portion and actions occurring after completing said fade portion.

4. The method of claim 1, wherein said edited fade portion comprises a highlighted area of importance for viewing, and wherein said method further comprises:
generating, by said processor, a video scroll bar comprising graphical user interface activation portions for activating specified actions associated with said highlighted area of importance for viewing and additional highlighted areas of importance for viewing; and
presenting, by said processor via said display device, video scroll bar adjacent to said edited fade portion patched into said video stream.

5. The method of claim 1, wherein said fade portion comprises a crossfade portion associated with said portion of said video stream.

6. The method of claim 1, wherein said fade portion comprises a dissolution between differing scenes within said portion of said video stream.

7. The method of claim 1, further comprising:
storing, by said processor, said edited fade portion patched into said video stream within a specialized portion of a specialized memory device.

8. The method of claim 1, further comprising:
providing at least one support service for at least one of creating, integrating, hosting, maintaining, and deploying computer-readable code in the control hardware, said code being executed by the computer processor to implement: said retrieving, said dividing, said analyzing said plurality of video frames, said analyzing said audio file, said detecting said speech polarity, said detecting said visual action epicenter, said removing, said generating, said patching, and said presenting.

9. A computer program product, comprising a computer readable hardware storage device storing a computer readable program code, said computer readable program code comprising an algorithm that when executed by a processor of a hardware device implements a method, said method comprising:
retrieving, by said processor, a portion of a video stream;
updating, by said processor, a document-based record configured to prevent additional system dispatchers from retrieving video files that have been processed;
executing, by said processor, a query with respect to said document-based record;
writing, by said processor in response to said executing said query, a JSON file into a disk-based queue for dispatch;
dividing, by said processor executing said JSON file within said disk-based queue for referencing a location of said portion of said video stream, said portion into a plurality of video frames and an audio file, wherein said dividing comprises:
associating each video frame of said plurality of video frames with a first specified time duration;
dividing said audio file into a plurality of audio file portions; and
associating each audio file portion of said plurality of audio file portions with a second specified time duration;
analyzing, by said processor executing a first encoder apparatus of said hardware device, said plurality of video frames with respect to sound, action, speech, and graphics;
analyzing, by said processor executing a second encoder apparatus of said hardware apparatus, each said audio file portion of said audio file;
detecting, by said processor executing a natural language processing (NLP) system, a speech polarity of each said audio file portion of said audio file;
detecting, by said processor based on analysis of an output of said first encoder apparatus, a visual action epicenter of said portion of said video stream;
removing, by said processor based on said analysis of said output of said first encoder apparatus and analysis of an output of said second encoder apparatus, a fade portion fading into a background of said portion of said video stream;
generating, by said processor based on said visual action epicenter and said fade portion, an edited fade portion associated with said fade portion, wherein said edited fade portion comprises first video frames for presentation within a foreground portion of said portion of said video stream, and wherein said generating said edited fade portion comprises randomly cropping and mirroring said fade portion into a set of new images comprised by said edited fade portion;
patching, by said processor, said edited fade portion into said video stream; and
presenting by said processor to users via a display device, said edited fade portion patched into said video stream.

10. The computer program product of claim 9, wherein said generating said edited fade portion comprises:
executing speed regression code with respect to actions of said visual action epicenter relative to said edited fade portion;
adjusting, based on results of said executing speed regression code, a speed of said edited fade portion; and
adjusting, based on said results of said executing speed regression code, a speed of said visual action epicenter.

11. The computer program product of claim 10, wherein said actions comprise actions occurring before said initiating said fade portion and actions occurring after completing said fade portion.

12. The computer program product of claim 9, wherein said edited fade portion comprises a highlighted area of importance for viewing, and wherein said method further comprises:
generating, by said processor, a video scroll bar comprising graphical user interface activation portions for activating specified actions associated with said highlighted area of importance for viewing and additional highlighted areas of importance for viewing; and
presenting, by said processor via said display device, video scroll bar adjacent to said edited fade portion patched into said video stream.

13. The computer program product of claim 9, wherein said fade portion comprises a crossfade portion associated with said portion of said video stream.

14. The computer program product of claim 9, wherein said fade portion comprises a dissolution between differing scenes within said portion of said video stream.

15. The computer program product of claim 9, wherein said method further comprises:
storing, by said processor, said edited fade portion patched into said video stream within a specialized portion of a specialized memory device.

16. A hardware device comprising a processor coupled to a computer-readable memory unit, said memory unit comprising instructions that when executed by the computer processor implements a method comprising:

retrieving, by said processor, a portion of a video stream;

updating, by said processor, a document-based record configured to prevent additional system dispatchers from retrieving video files that have been processed;

executing, by said processor, a query with respect to said document-based record;

writing, by said processor in response to said executing said query, a JSON file into a disk-based queue for dispatch;

dividing, by said processor executing said JSON file within said disk-based queue for referencing a location of said portion of said video stream, said portion into a plurality of video frames and an audio file, wherein said dividing comprises:

associating each video frame of said plurality of video frames with a first specified time duration;

dividing said audio file into a plurality of audio file portions; and associating each audio file portion of said plurality of audio file portions with a second specified time duration;

analyzing, by said processor executing a first encoder apparatus of said hardware device, said plurality of video frames with respect to sound, action, speech, and graphics;

analyzing, by said processor executing a second encoder apparatus of said hardware apparatus, each said audio file portion of said audio file;

detecting, by said processor executing a natural language processing (NLP) system, a speech polarity of each said audio file portion of said audio file;

detecting, by said processor based on analysis of an output of said first encoder apparatus, a visual action epicenter of said portion of said video stream;

removing, by said processor based on said analysis of said output of said first encoder apparatus and analysis of an output of said second encoder apparatus, a fade portion fading into a background of said portion of said video stream;

generating, by said processor based on said visual action epicenter and said fade portion, an edited fade portion associated with said fade portion, wherein said edited fade portion comprises first video frames for presentation within a foreground portion of said portion of said video stream, and wherein said generating said edited fade portion comprises randomly cropping and mirroring said fade portion into a set of new images comprised by said edited fade portion;

patching, by said processor, said edited fade portion into said video stream; and presenting by said processor to users via a display device, said edited fade portion patched into said video stream.

17. The hardware device of claim 16, wherein said generating said edited fade portion comprises:

executing speed regression code with respect to actions of said visual action epicenter relative to said edited fade portion;

adjusting, based on results of said executing speed regression code, a speed of said edited fade portion; and adjusting, based on said results of said executing speed regression code, a speed of said visual action epicenter.

18. The hardware device of claim 17, wherein said actions comprise actions occurring before said initiating said fade portion and actions occurring after completing said fade portion.

19. The hardware device of claim 16, wherein said edited fade portion comprises a highlighted area of importance for viewing, and wherein said method further comprises:

generating, by said processor, a video scroll bar comprising graphical user interface activation portions for activating specified actions associated with said highlighted area of importance for viewing and additional highlighted areas of importance for viewing; and presenting, by said processor via said display device, video scroll bar adjacent to said edited fade portion patched into said video stream.

20. The hardware device of claim 16, wherein said fade portion comprises a crossfade portion associated with said portion of said video stream.

* * * * *